(12) United States Patent
Ericson et al.

(10) Patent No.: US 6,570,104 B1
(45) Date of Patent: May 27, 2003

(54) POSITION DETERMINATION

(75) Inventors: Petter Ericson, Malmö (SE); Ola Hugosson, Lund (SE)

(73) Assignee: Anoto AB, Lund (SE)

( * ) Notice: Subject to any disclaimer, the term of this patent is extended or adjusted under 35 U.S.C. 154(b) by 0 days.

(21) Appl. No.: 09/580,338

(22) Filed: May 26, 2000

Related U.S. Application Data
(60) Provisional application No. 60/138,399, filed on Jun. 9, 1999.

(30) Foreign Application Priority Data

May 28, 1999 (SE) ............................. 9901954-9

(51) Int. Cl.[7] .......................... G09G 1/10; G06K 19/06
(52) U.S. Cl. ..................... 178/18.09; 382/306; 235/494
(58) Field of Search ................................. 345/179, 166, 345/175; 178/18.09, 18.01, 19.015; 382/306, 232, 313, 317, 321; 235/462.1, 454, 456, 487, 494, 472.01; 358/403, 471; 250/237 G, 231.14; 341/13, 143, 9; 356/617; D14/406

(56) References Cited

U.S. PATENT DOCUMENTS

| | | | | |
|---|---|---|---|---|
| 4,420,682 A | | 12/1983 | Huber | 235/472.01 |
| 4,572,952 A | | 2/1986 | March | 250/237 G |
| 4,803,737 A | * | 2/1989 | Sato et al. | 382/313 |
| 5,047,631 A | * | 9/1991 | Frese | 250/237 G |
| 5,068,529 A | * | 11/1991 | Ohno et al. | 250/231.18 |
| 5,235,181 A | * | 8/1993 | Durana et al. | 250/231.18 |
| 5,252,825 A | * | 10/1993 | Imai | 250/231.18 |
| 5,418,362 A | * | 5/1995 | Lusby et al. | 250/231.18 |
| 5,442,147 A | * | 8/1995 | Burns et al. | 178/18.09 |
| 5,477,012 A | * | 12/1995 | Sekendur | 178/18.09 |
| 5,557,076 A | * | 9/1996 | Wieczorek et al. | 178/18.03 |
| 5,652,412 A | * | 7/1997 | Lazzouri et al. | 178/18.01 |
| 5,675,129 A | * | 10/1997 | Burns et al. | 178/18.01 |
| 5,754,568 A | * | 5/1998 | Braasch | 714/799 |
| 5,852,434 A | | 12/1998 | Sekendur | 345/179 |
| 5,864,127 A | * | 1/1999 | Jackson et al. | 235/454 |
| 5,937,110 A | | 8/1999 | Petrie et al. | |
| 6,076,738 A | * | 6/2000 | Bloomberg et al. | 235/494 |
| 6,182,901 B1 | * | 2/2001 | Hecht et al. | 235/494 |
| 6,208,771 B1 | | 3/2001 | Jared et al. | |
| 6,327,395 B1 | * | 12/2001 | Hecht et al. | 382/306 |
| 6,330,976 B1 | * | 12/2001 | Dymetman et al. | 235/487 |

FOREIGN PATENT DOCUMENTS

| | | |
|---|---|---|
| EP | 0171284 A2 | 2/1986 |
| EP | 0276109 A2 | 7/1988 |
| WO | WO8500234 | 1/1985 |
| WO | WO9217589 | 10/1992 |

* cited by examiner

*Primary Examiner*—Steven Saras
*Assistant Examiner*—Leland R. Jorgensen
(74) *Attorney, Agent, or Firm*—Birch, Stewart, Kolasch & Birch, LLP

(57) ABSTRACT

A position-coding pattern (3) which extends across a surface and codes a plurality of positions (7a, 7b) on the surface is described. The coding in a first dimension is based on the use of a first and a second string of symbols, each containing a predetermined number of symbols and each having the characteristic that if a specific number of symbols is taken from the first string of symbols, the location of these symbols in the string of symbols is unambiguously determined. By means of displacements between these strings of symbols, a large number of positions can be coded in the first dimension. A third string of symbols of the same type is used for the coding in a second dimension.

23 Claims, 1 Drawing Sheet

POSITION DETERMINATION

This application claims the benefit of Ser. No. 60/138, 399, filed Jun. 9, 1999.

FIELD OF THE INVENTION

The invention also relates to a method of creating a position-coding pattern, use of a position-coding pattern, a device for position determination and storage media storing computer programs for generating and for decoding of the position-coding pattern.

BACKGROUND OF THE INVENTION

In many situations it is desirable to be able to determine an absolute position on a surface, for example in connection with the digitization of drawings or when one wishes to create an electronic version of handwritten information.

U.S. Pat. No. 5,852,434 describes a device for the determination of an absolute position. The device comprises a writing surface provided with a position code by means of which it is possible to determine X- and Y-coordinates, a detector capable of detecting the position code, and a processor capable of determining the position of the detector in relation to the writing surface on the basis of the detected position code.

Three examples of a position code are provided in U.S. Pat. No. 5,852,434. The first example is dots, each of which is made up of three concentric circles. The outermost circle represents the X-coordinate and the middle circle represents the Y-coordinate. Furthermore, the two outermost circles are divided into 16 parts, which depending upon whether they are filled in or not indicate different numbers. This means that each pair of coordinates X, Y is coded with a dot with a specific appearance.

In the second example, the coordinates are indicated in each point on the writing surface with the aid of a barcode, a barcode for the X-coordinate being placed above a barcode for the Y-coordinate.

As a third example, it is stated that a checkerboard pattern can be used for coding the X- and Y-coordinates. However, no explanation is given of how the checkerboard pattern is structured or how it can be translated into coordinates.

One problem associated with the known pattern is that it is made up of complex symbols. The smaller these symbols are the more difficult it is to produce the patterned writing surface and the greater the risk of incorrect position determination. But the larger the symbols, the poorer the position resolution.

A further problem is that the image processing becomes fairly complicated because of the fact that the symbols that must be interpreted are complex.

Yet another problem is that the sensor surface of the device used for recording the symbols must be made large enough to enable it to record four symbols at the same time so that it will definitely record at least one symbol in its entirety, which is necessary in order to carry out the position determination.

WO 92/17859 discloses a device for position determination which comprises a code surface with a pattern which has a so-called windowing pattern. This means that the pattern has the property that for each arbitrary partial surface of the pattern of a predetermined magnitude, the location of the partial surface in the pattern can be determined. The pattern is composed of so-called m-sequences which have the property that each subsequence of the length k appears only once in the sequence.

Appendix A of WO 92/17859 provides the following examples of how the pattern can be composed and how a position can be decoded.

Start from the following m-sequences: s=(0,0,1,0,1,1,1) and t=(0,1,1). Build a position-coding pattern by letting a first column in the pattern equal the sequence s. To build the following columns, look at the t-sequence. If the first element in the t-sequence is 0, the second column consists of the s-sequence. If the first element instead is 1, the second column consists of the s-sequence circularly shifted by one step. The following columns are built in a corresponding manner according to the values of the elements in the t-sequence. The following pattern is then obtained:

| 0 | 0 | 1 | 1 |
|---|---|---|---|
| 0 | 0 | 0 | 1 |
| 1 | 1 | 0 | 0 |
| 0 | 0 | 1 | 0 |
| 1 | 1 | 0 | 1 |
| 1 | 1 | 1 | 0 |
| 1 | 1 | 1 | 1 |

Now assume that one wants to find the position of a partial surface with the below indicated subset of the pattern.

| 1 | 0 | 0 |
|---|---|---|
| 0 | 1 | 0 |
| 1 | 0 | 1 |

The first column in the subset is (1,0,1). This subsequence appears in position 2 in the s-sequence. The circular shifts in the subset are (1,1). This subsequence appears in position 1 in the t-sequence. The accumulated appears in the pattern are (0,0,1,2) and therefore the vertical position of the subset is 2+0=2. The position of the subset on the partial surface thus is (1,2).

With this pattern, the above described problems are obviated, involving complex symbols and the need for recording four symbols in order to definitely record one symbol in its entirety.

An interesting characteristic of a position-coding pattern of this type, however, is the possibility of coding a large pattern with many unique positions so that position determination can be carried out on a surface which is as large as possible. In the example above, the magnitude is limited in the vertical direction by the length of the s-sequence and the magnitude in the horizontal direction by the length of the t-sequence. The length of these sequences can, however, not be increased infinitely since the sequences should have the characteristic that if one takes a subsequence of k-bits, this subsequence should only appear in one position in the sequence. An increase of the sequence length may thus require an increase of the subsequence length and thus an increase of the partial surface that must be recorded to be able to determine a position.

SUMMARY OF THE INVENTION

It is an object of the present invention to completely or partly obviate this problem.

This object is achieved by a product according to claim 1, a method of creating a position-coding pattern according to claim 10, electronic storage media according to claims 14, 15 and 16, a device for position determination according to claim 20 and use of a position-coding pattern according to claim 23.

More specifically, the invention relates to a product for position determination, which product has a surface and a position-coding pattern which extends across the surface and codes a plurality of positions on the surface, each position of a said plurality of positions being coded by a specific part of the position-coding pattern and each such specific part of the position-coding pattern also contributing to the coding of adjacent positions, said position-coding pattern further being based on a first string of symbols which contains a first predetermined number of symbols and which has the characteristic that if one takes a second predetermined number of symbols from the first string of symbols, the location of these symbols in the first string of symbols is unambiguously determined, the first string of symbols being used to determine the position in a first dimension on the surface. Moreover the position-coding pattern contains at least a first row of symbols which are arranged according to the first string of symbols, and at least a second row of symbols which are arranged according to a second string of symbols having the same characteristic as the first string of symbols, a displacement being obtained between the first and the second string of symbols along the first and the second row when the first and the second string of symbols are repeated on them.

By using the displacement between a first and a second string of symbols, it is possible to code a larger number of positions in the direction in which the first and the second string of symbols are used for the coding. If the first string of symbols has the length n and the second string of symbols has the length n−1, it is possible to code, instead of n-positions, n(n−1) positions in the direction in which the first string of symbols is used by utilizing the first displacement or interference obtained between the first and the second in this direction.

It is evident that the position-coding pattern is of the same type, i.e. has the same characteristic as the windowing pattern described by way of introduction.

The term "row" should here be interpreted in a wide sense and not be considered limited to horizontal rows, but also comprise all rows independently of the angle at which they are arranged to the horizontal plane.

One example of strings of symbols having the above-described characteristics is the "m-sequences" mentioned by way of introduction.

In a preferred embodiment, the second string of symbols is a subset of the first string of symbols. This has the advantage that the memory need for decoding of the pattern decreases.

The position-coding pattern can be formed with two rows only. In most applications, however, it is necessary to determine positions on a surface that has a larger extent in both dimensions. To this end, the position-coding pattern comprises in an advantageous embodiment a plurality of first rows and a plurality of second rows, the displacements being between the first and the second string of symbols being of different magnitude between different rows. The different displacements between the rows can be used to determine the position in the second dimension.

To enable efficient determination of the position in a second dimension on the surface, a position-coding pattern is advantageously arranged in such manner that the displacement between the first and the second string of symbols in each pair of an adjoining first and second row is within one of a plurality of predetermined ranges. The displacement between a pair of two adjoining rows will thus vary merely within a predetermined range along the pair of rows. Thus the range is constant along the pair of rows.

In an advantageous embodiment, the position-coding pattern can further be based on a third string of symbols having the same characteristic as the first string of symbols, the third string of symbols being used to determine the position in a second dimension on the surface.

Despite the increase in the number of codable positions in the first dimension, the coding in the second dimension can thus be carried out by means of a string of symbols of the above-mentioned type. This makes it possible to determine the position in the second dimension without capacity-requiring calculations. A simple table look-up is sufficient.

The third string of symbols can advantageously be a number series consisting of numbers which each are a function of said displacements. The numbers in the number series thus represent the size of the displacements.

The first and the second rows can advantageously begin in varying positions in the first and the second strings of symbols.

In the presently preferred embodiment, the first string of symbols is a series of binary numbers and the third string of symbols is a number series with a different base, so that great displacements are allowed between the first and second rows and, thus, many positions in the first dimension can be coded.

The product to which the position-coding pattern is applied can be any product having a surface upon which one wishes to determine a position. It can be of a passive type. Accordingly, it need not transmit signals itself; rather it has a pattern which can be read by means of an active device.

The position-coding pattern can be any arrangement of lines, figures, surfaces or the like which enables the coding of positions in the above manner.

The symbols in the pattern can be of any suitable type whatever. They are preferably graphical so that no character recognition (OCR) need be made in the position determination, but they could also consist of numbers or characters.

The pattern can be made up, for example, of a plurality of discrete symbols of at least a first type. The coding can be binary, in which case for example the presence of a symbol can represent a one and the absence of a symbol can represent a zero. However, this type of coding can cause problems in positions which are coded only or primarily with zeros.

In the most preferred embodiment, the symbols are therefore merely of a first and a second type which have the same form but different magnitude.

Such a pattern can also be used for binary coding. It is very easy to apply to a surface since the symbols can be very simple, for example consisting of two dots of different diameters. The product having a surface with this pattern is thus easy to manufacture since the information content of each symbol is small. Furthermore, it facilitates image processing.

The position-coding pattern can be implemented using any parameter which can be read by an area sensor on a partial surface on the surface across which the position-coding pattern extends. The parameter can be electrical or chemical or of some other type. The pattern can, for example, be designed in such a way that the conductance on the surface varies in the manner indicated. However, the pattern is preferably optically readable since this makes applying it to the surface easy. It should thus be capable of reflecting light. However, the light need not be in the visible range.

The positions can preferably be indicated as coordinates in a Cartesian or a polar coordinate system.

It has been found difficult to generate at random a position-coding pattern without ambiguities which has the characteristic that a position can be determined by means of an arbitrary partial surface of a predetermined size. This problem is solved according to another aspect of the invention by a method of creating a position-coding pattern, which position-coding pattern is designed for coding a plurality of positions on a surface, comprising the step of arranging, on at least a first row, symbols in accordance with a first string of symbols which contains a first predetermined number of symbols and has the characteristic that if one takes a second predetermined number of symbols from the first string of symbols, the location of these symbols in the string of symbols is unambiguously determined, and further comprising the step of arranging, on at least a second row, symbols in accordance with a second string of symbols having the same characteristic as the first string of symbols, a displacement being obtained between the first and the second string of symbols along the first and the second row when the first and the second string of symbols are repeated on them.

This method is advantageous because it enables rule-based generation of an unambiguous position-coding pattern which can code more positions in a first dimension that what can be coded merely with the first string of symbols.

That stated above regarding the position-coding pattern on the product is, of course, in applicable parts also related to the method.

The decoding of the above position-coding pattern is advantageously carried out by means of a computer program.

According to another aspect of the invention, it therefore relates to storage medium for a computer, on which there is stored a computer program with instructions for decoding of the position-coding pattern on a product according to any one of claims 1–9.

The generation of the position-coding pattern is also advantageously made by means of a computer program, which can control a printer or some other type of printing device. To this end, the invention relates according to one more aspect to a storage medium for a computer, on which there is stored a computer program with instructions for generation of the position-coding pattern on a product according to any one of claims 1–9.

According to one more aspect of the invention, it relates to a storage medium for a computer, on which there is stored a computer program for determining the position of a partial surface on a surface which is provided with a position-coding pattern comprising a plurality of symbols, on the basis of an input signal representing the partial surface, said computer program comprising instructions for identifying a plurality of symbols in the input signal, which are arranged in a predetermined number of symbol groups; determining the location of each symbol group in at least a first predetermined string of symbols; determining a difference number which is based on the relative positions of the symbol groups in said at least a first predetermined string of symbols; determining the location of said difference number in a second predetermined number series; determining a first coordinate for the position of the partial surface on the surface on the basis of the position of said difference number in the second predetermined number series, and determining a second coordinate for the position of the partial surface on the surface on the basis of the relative positions of two adjoining symbol groups in said at least a first predetermined string of symbols.

In the decoding of the position-coding pattern, a partial surface of the pattern is read. This partial surface contains a number of symbol groups which can be arranged in rows or in some other predetermined manner. In the determination of the one coordinate, use is made of not only one symbol group but two adjoining symbol groups, which permits determination of position in one dimension for the position-coding pattern of the above type.

The input signal advantageously is an image.

The storage medium can be any type of medium on which a computer program can be stored, such as a diskette, a disk, a memory in a computer or some other processor-based device.

The program for generating the pattern is preferably used in a computer which is connected to a printer or some other device which makes it possible to produce the pattern on the product.

The program for decoding the pattern can preferably be arranged in a handheld device which is used for reading the pattern or in a computer to which the reading device is connected.

According to still another aspect of the invention, it relates to a device for position determination, comprising a sensor for reproducing one partial surface of a plurality of partial surfaces on a surface and image-processing means which are adapted to decode a position-coding pattern on a product according to any one of claims 1–9.

Since the image-processing means of the device can determine the position in a "rule-based" manner on the basis of the above-described position-coding pattern, the device need not have a large amount of memory capacity, which is advantageous in respect of the production cost of the device and the possibility of making a stand alone unit.

The image-processing means advantageously consist of a suitably programmed processor.

The invention can be implemented as an independent unit, which advantageously can transfer position information in a wireless manner to an external unit. Alternatively, the sensor can be positioned in a first casing while the image-processing means are positioned in another casing, e.g. a personal computer to which images recorded by the sensor are transferred.

According to one more aspect of the invention, it relates to use of a position-coding pattern for determining a position, said position-coding pattern being based on a first string of symbols which contains a first predetermined number of symbols and which has the characteristic that if one takes a second predetermined number of symbols from the first string of symbols, the location of these symbols in the string of symbols is unambiguously determined, and said position-coding pattern consisting of the symbols in the first string of symbols, the symbols being placed in at least a first row in accordance with the first string of symbols and at least a second row in accordance with a second string of symbols having the same characteristic as the first string of symbols, a displacement being obtained between the first and the second string of symbols along the first and the second row when the first and the second string of symbols are repeated on them.

Use may consist of, for instance, storage of the pattern in electronic form.

The invention can be applied in a number of different fields. It can be used to continuously record the position of a pen which is passed across a sheet of paper or some other writing surface. It can also be used in all contexts where the position of a tool or the like need be determined. It may also be used as a mouse pad for a mouse.

BRIEF DESCRIPTION OF THE DRAWINGS

Embodiments of the present invention will now be described in more detail with reference to the accompanying drawings, in which.

DESCRIPTION OF PREFERRED EMBODIMENTS

Figure 1:
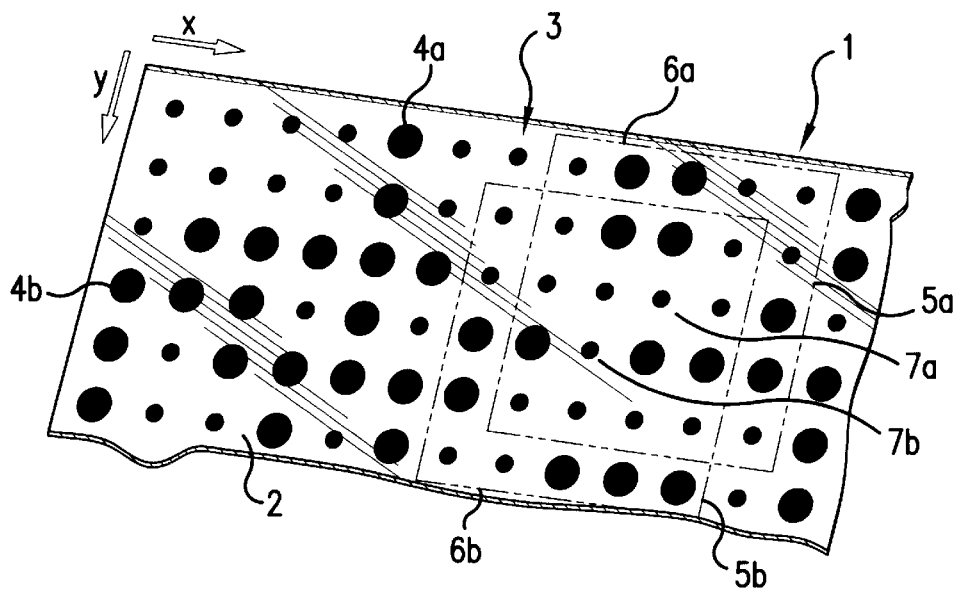
FIG. 1 shows a part of a product, in this case a sheet of paper, whose surface is provided with a pattern enabling position determination.

FIG. 1 shows a part of a sheet of paper 1, which on its surface 2 is provided with an optically readable pattern 3 enabling position determination. In this case, the position determination can be carried out across the entire surface of the product. In other cases, the surface permitting position determination may be a smaller part of the product.

The position-coding pattern 3 is made up of symbols 4 of a first and second type 4a, 4b and more specifically of dots of two different sizes, the dots 4a having the larger diameter representing a one and the dots 4b having the smaller diameter representing a zero. For the sake of clarity, the dots have been enlarged.

The position-coding pattern is arranged so that if a device images the dots on an arbitrary partial surface of a predetermined size, the position of the partial surface on the surface of the sheet can be determined automatically starting from the position-coding pattern on the partial surface with the aid of image-processing means in the device. Dashed lines indicate a first and a second partial surface 5a and 5b respectively. The part of the position-coding pattern which is located on the first partial surface 5a constitutes a first specific part 6a of the position-coding pattern. This first specific part codes a first position 7a, which coincides with the middle symbol on the partial surface. Correspondingly, a second position 7b is coded by the specific part 6b of the position-coding pattern located on the second partial surface 5b. The position-coding pattern is thus partially shared by the adjoining positions 7a and 7b.

An example of a position-coding pattern enabling position determination will be described below. The pattern is adapted for position determination by the imaging of a partial surface containing 5×5 symbols. As mentioned above, the symbols represent a binary coding.

The sheet has an x-direction and a y-direction. In order to code the position in the x-direction, a 32-bit number series of ones and zeros is generated in a first step. In a second step, a 31-bit number series of ones and zeros is generated by removing the final bit of the 32-bit series. Both number series, hereinafter called the x-number series, should have the characteristic that if five successive numbers are selected anywhere in the series a unique group of five bits is obtained which does not exist anywhere else in the series. They should also have this characteristic if one "connects" the end of the series to the beginning of the series. The five-bit group thus provides an unambiguous coding of the location in the series.

An example of a 32-bit number series having the above characteristic is "00001000110010100111010110111110".

If the last zero is removed from this number series, a 31-bit number series having the same characteristic is obtained.

The first five bits in the above number series, i.e. 00001, constitute the code for position 0 in the number series, the next five bits, i.e. 00010, constitute the code for position 1, etc. The positions in the x-number series as a function of the five-bit groups are stored in a first table. Naturally, position 31 only exists in the 32-bit series. Table 1 below shows the position coding for the example described above.

TABLE 1

| Position | Five-bit Group |
|---|---|
| 0 | 00001 |
| 1 | 00010 |
| 2 | 00100 |
| 3 | 01000 |
| 4 | 10001 |
| 5 | 00011 |
| 6 | 00110 |
| 7 | 01100 |
| 8 | 11001 |
| 9 | 10010 |
| 10 | 00101 |
| 11 | 01010 |
| 12 | 10100 |
| 13 | 01001 |
| 14 | 10011 |
| 15 | 00111 |
| 16 | 01110 |
| 17 | 11101 |
| 18 | 11010 |
| 19 | 10101 |
| 20 | 01011 |
| 21 | 10110 |
| 22 | 01101 |
| 23 | 11011 |
| 24 | 10111 |
| 25 | 01111 |
| 26 | 11111 |
| 27 | 11110 |
| 28 | 11100 |
| 29 | 11000 |
| 30 | 10000 |
| 31 | 00000 |

It is only possible to code 32 positions, i.e. positions 0–31, with the aid of the 32-bit series. However, if one writes the 31-bit series 32 times in succession on a first row and the 32-bit series 31 times in succession on a second row below the first row, the series will be displaced in relation to each other in such a way that two five-bit groups written one above the other can be used to code 31×32=992 positions in the direction of the rows.

For example, suppose that the following code is written on the sheet:

000 . . . 111110000010001100101001110101101111110 . .

000 . . . 111110000100011001010011101011011111100 . .

If the five-bit groups are translated into positions according to Table 1, the following positions of the 32- and 31-bit series are indicated on the sheet.

0 1 2 . . . 30 31 0 1 2 . . . 29 30 31 0 1 2

0 1 2 . . . 30 0 1 2 3 . . . 30 0 1 2 3 4

The coding in the X-direction is thus based on using a number series consisting of n bits which is made up in such a way that if m successive numbers are taken from the series, these m numbers will code the position in the series unambiguously. The number of codable positions is increased by using a second number series, which is a subset of the first number series and which is thus of a different length than the first series. In this way, a displacement between the series is obtained in the longitudinal direction of the rows.

The coding in the Y-direction is based on the same principle. A number series is created, hereinafter called the Y-number series, which consists of p numbers, the series being made up in such a way that if r successive numbers are taken from the series, these r numbers will code the position in the series and thus the position in the Y-direction unambiguously. The numbers in the Y-number series are coded in the pattern on the sheet as a difference between the positions in the X-direction in two rows, which is calculated in a special way.

More specifically, alternate rows of the 31-bit series and the 32-bit series are written as follows:

Row 1: (31) (31) (31) (31) . . .
Row 2: (32) (32) (32) (32) . . .
Row 3: (31) (31) (31) (31) . . .
Row 4: (32) (32) (32) (32) . . .
Row 5: (31) (31) (31) (31) . . .
.
.
.

Naturally, on the sheet, the series are written using the two different sizes of dots. The rows start in different positions in the X-number series. More specifically, one begins two successive rows in such a way that if one determines the difference modulo 32 between two position numbers located one above the other, expresses the difference by means of a five-bit binary number, and takes the two most significant bits of said five-bit binary number, this number shall be the same regardless of where one is in the row. In other words, one starts the series in such a way that the displacements between the series in two successive rows remain within a specific interval along the entire row. In this example, the maximum displacement can be 31 positions or bits and the minimum displacement can be 0 positions or 0 bits. The displacements along each pair of rows is then within one of the intervals 0–7, 8–15, 16–23, or 24–31 positions/bits.

For example, suppose that the series are written as follows (expressed in position numbers):

Row 1: 0 1 2 3 4 5 6 7 . . . 30 0 1 2 3
Row 2: 0 1 2 3 4 5 6 7 . . . 30 31 0 1 2
Row 3: 25 26 27 28 29 30 0 1 . . . 24 25 26 27 28
Row 4: 17 18 19 20 21 22 23 24 . . . 15 16 17 18 19
Row 5: 24 25 26 27 28 29 30 0 . . . 23 24 25 26 27

If the difference is determined in the above way, it will be 0 between rows 1 and 2, 0 between rows 2 and 3, 1 between rows 3 and 4, and 3 between rows 4 and 5. Take, for example, 26–18 in rows 3 and 4, which equals 8, which is 0100 in binary code. The two most significant numbers are 01. If instead one takes 0–23 in the same rows, modulo 32 equals 9, the two most significant numbers are 01 just like in the previous example. In this example, four difference numbers 0 and 0 and 1 and 3 are obtained, which together form the difference number 0,0,1,3. Now, if in same way as for the X-direction, one has created a Y-number series from the numbers 0, 1, 2, and 3 which has the characteristic that if four successful numbers are taken from the series, the position in the series will be determined unambiguously, it is possible by looking up the number 0013 as address in a table to unambiguously determine the position in the Y-direction. In this way, it is possible to determine 256 unique positions in the Y-direction.

The following is an example of the beginning and the end of a Y-number series containing the numbers 0–3:

TABLE 2

| | |
|---|---|
| 0 | 0000 |
| 1 | 0001 |
| 2 | 0010 |
| 3 | 0100 |
| 4 | 1000 |
| 5 | 0002 |
| 6 | 0020 |
| 7 | 0200 |
| 8 | 2000 |
| 9 | 0003 |
| 10 | 0030 |
| . | . |
| . | . |
| . | . |
| 251 | 2333 |
| 252 | 3333 |
| 253 | 3330 |
| 254 | 3300 |
| 255 | 3000 |

The following is a description of how the position determination is carried out. Suppose that one has a sheet as described above which across its surface has a pattern made up of a first symbol representing a 1 and a second symbol representing a 0. The symbols are arranged in rows and columns and in 32-bit and 31-bit series as described above. Furthermore, suppose that one wishes to determine the position on the sheet where one places a device equipped with a sensor which can record an image containing 5×5 symbols.

Suppose that an image recorded by the optical sensor looks as follows:

| | | | | |
|---|---|---|---|---|
| 1 | 1 | 1 | 1 | 1 |
| 1 | 1 | 1 | 1 | 1 |
| 0 | 1 | 0 | 1 | 0 |
| 0 | 0 | 1 | 0 | 1 |
| 0 | 0 | 1 | 0 | 1 |

In a first step, the device translates these five-bit groups into positions with the aid of Table 1. The following positions are obtained:

26 (11111)
26 (11111)
11 (01010)
10 (00101)
10 (00101)

Subsequently, the magnitude of the displacement between the position numbers in the different rows is determined by taking the difference modulo 32. The two most significant numbers of the differences determined in this manner, expressed as five-bit binary numbers, yield the difference number 0, 1, 0, 0 in the base 4 which is used in the y-number series. According to Table 2, this difference number equals position 3 in the Y-direction. Thus, the coordinate of the second dimension on the sheet is 3.

A third table stores the starting position of each row, i.e. the position in the X-number series where each row starts. In this case, with the aid of the y-coordinate 3, it is possible to look up the starting positions of the rows from which the recorded five-bit groups have been taken. Knowing the starting positions of the rows from which the two uppermost five-bit groups have been taken and the X-positions to which these two five-bit groups correspond, i.e. positions 26 and 26, it is possible to determine the x-coordinate, or the position in the first dimension, of the recorded image. For example, suppose that the starting positions of the two uppermost rows are 21 and 20 respectively. In this case, the two rows from which the two uppermost five-bit groups in the recorded image are taken will thus look as follows:

Row 3: 21 22 23 . . . 29 30 31 0 1 2 . . . 25 26 27 . . .
Row 4: 20 21 22 . . . 28 29 30 0 1 2 . . . 25 26 27 . . .

It follows from the fact that the y-coordinate is 3 that the two first five-bit groups are taken from rows 3 and 4. It follows from the fact that odd rows are made up of the 32-bit number series and even rows are made up of the 31-bit number series that row 3 is made up of 32-bit number series while row 4 is made up of a 31-bit number series.

On the basis of this information, it is possible to determine that the x-coordinate is 37. This can be verified by repeating the above steps for the remaining pairs of five-bit groups in the recorded image. There is thus a certain amount of error tolerance.

The accuracy of the position determination can be further increased by determining the location of the middle dot in the 5×5 group in relation to the center of the image. The position resolution can thus be better than the distance between two symbols.

Naturally, the above steps are carried out by the software in the position-determination device, which in this example gives the coordinates 3 and 37 for the upper left corner of the partial group of symbols as its output signal.

The position-coding pattern can also be used for determining the position in a third dimension in relation to the surface, i.e. in the Z-direction. This is achieved by determining the size of the symbols in the recorded image and comparing it to a reference value representing the size of the symbols when they are imaged by means of a position-determination device which is held next to the surface on which the position-coding pattern is located. In this way, the device can thus automatically determine whether the device is close to the surface, in which case position determination is to be carried out, or spaced from the surface, in which case position determination shall not be carried out, and trigger image recording depending on this.

The above description relates to an example which can be generalized. There need not be 32 numbers in the first X-number series. The number depends on how many different symbols are to be used in the pattern in combination with the number of symbols which are recorded in the X-direction in connection with the position determination. For example, if the number of different symbols is 3 and the number of recorded symbols is 3, the maximum number of numbers in the X-number series will be 3×3×3=27 instead of 32. The same type of reasoning applies to the Y-number series. The bases of these number series can thus be different and the number of symbols which code a position, and consequently also the number of positions coded by the number series, can vary. Moreover, the series need not be based on numbers but can be based on other symbols and can therefore be described as strings of symbols.

As mentioned above, the symbols can be of many different kinds. They can also be numbers, but in that case OCR software is required for carrying out the position determination, which makes the device for position determination more expensive and more complicated. It also leads to increased error sensitivity.

The above method of coding positions on a surface and of carrying out the position determination on the surface is advantageous in that it only requires a very small amount of memory and processor capacity. In the above example, it is only necessary to store Table 1 with 32 rows, Table 2 with 256 rows, and Table 3 with 256 rows. The position determination can be carried out by means of three table look-ups and a simple calculation. If the above described second x-number series, i.e. the 31-bit series, is not a subset of the first x-number series, one more table corresponding to Table 1 is required for the second x-number series.

Furthermore, the method of coding positions on the surface is also advantageous because the image upon which the position determination is based can be captured at any rotation in relation to the surface upon which the position is to be determined. In the first place, an image contains a number of rows which shall be horizontal. This means that there are only four possible orientations. In 98% of the cases, only one of the four orientations gives a position. In the cases where there is doubt, it can be removed by recording two adjacent images and determining the positions on the basis of these images at all possible orientations of the symbols in the images, the criterion being that the position determination shall result in two adjacent positions.

On the basis of the above-mentioned code, position determination can also be carried out in ways other than those described above.

The recorded image of a partial surface of the position-coding pattern can be matched with an image of the whole position-coding pattern. However, this requires a great deal of processor capacity.

Alternatively, the symbols in the image can be translated into an address in a table in which the coordinates are stored. However, this requires a great deal of memory capacity.

The above position-coding pattern makes it possible to code $2^k(2^k-1)/m$ positions in the x-direction, k being the number of read symbols in the x-direction and y-direction and m being the number of displacement ranges. In the y-direction, $m^{k-1}$ can be coded. In the example above with k=5 and m=4 this gives 63488 positions. The known pattern described by way of introduction can, with a corresponding number of read symbols, code $2^k \times 2^{k-1}=512$ positions.

Figure 2:
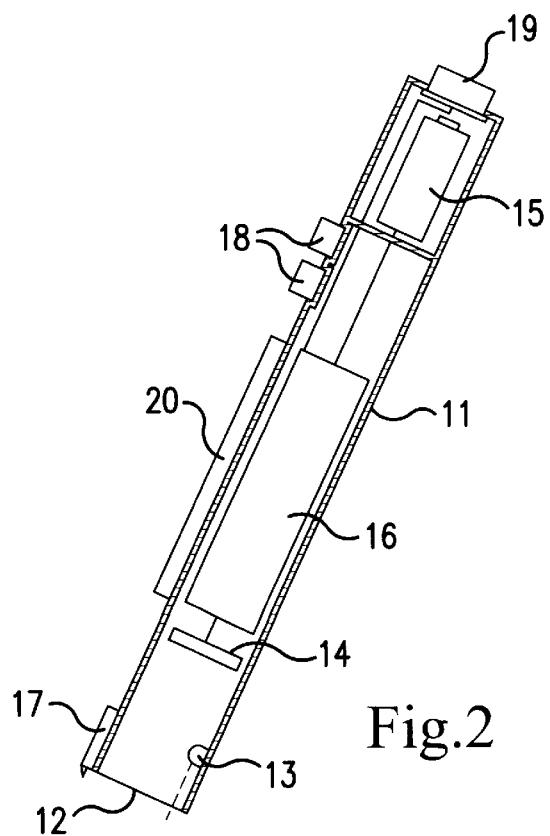
FIG. 2 shows a device enabling the determination of the position of a product on a surface.

An embodiment of a device for position determination is schematically shown in FIG. 2. It comprises a casing 11 having approximately the same shape as a pen. In one short side of the casing there is an opening 12. The short side is intended to abut against or be placed a short distance from the surface on which the position determination is to be carried out.

The casing 1 essentially contains an optics part, an electronic circuitry part, and a power supply.

The optics part comprises at least one light-emitting diode 13 for illuminating the surface which is to be imaged and a light-sensitive area sensor 14, such as a CCD or CMOS sensor, for recording a two-dimensional image. The device may also comprise a lens system.

The power supply to the device is obtained from a battery 15, which is mounted in a separate compartment in the casing.

The electronic circuitry part comprises image-processing means 16 for determining a position on the basis of the recorded image and more specifically a processor unit with a processor which is programmed to read images from the sensor and to carry out position determination on the basis of these images.

Furthermore, the device comprises a pen point 17, with the aid of which it is possible to write ordinary pigment-based writing on the surface upon which the position determination is to be carried out. The pen point 17 is extendable and retractable so that the user can control whether or not it is to be used.

Moreover, the device comprises buttons 18 by means of which the user activates and controls the device. It also comprises a transceiver 19 for wireless transfer, e.g. using IR light or radio waves, of information to and from the device. The device can also comprise a display 20 for showing positions.

The Applicant's Swedish patent No. 9604008-4 describes a device for recording text. This device can be used for position determination if programmed in a suitable way. If it is to be used for pigment-based writing it must also have a pen point.

As mentioned above, the device can be divided into different physical casings, a first casing containing components required for capturing images of the position-coding pattern and for transferring them to components which are located in a second casing and which carry out the position determination on the basis of the recorded image or images.

In the above embodiment, the pattern is optically readable and, accordingly, the sensor is optical. As mentioned above, the pattern can be based on a parameter other than an optical parameter. Obviously, in that case, the sensor must be of a type which can read the parameter in question.

What we claim and desire to secure by Letters Patent is:

1. A product for position determination, which product has a surface and a position-coding pattern applied to the surface and codes a plurality of positions on the surface, each position being coded by a specific part of the position-coding pattern and each such specific part of the position-coding pattern also contributing to the coding of adjoining positions, said position-coding pattern being based on a first string of symbols including a first predetermined number of symbols and which has the characteristic that if a group of symbols comprising a specific number of symbols less than said first number is taken from the first string of symbols, the location of said group of symbols in the first string of symbols is unambiguously defined, wherein said position-coding pattern comprises a first row of symbols comprising said first string of symbols repeated several times, and at least a second row of symbols comprising a second string of symbols repeated several times and having said characteristic of said first string of symbols, said second string of symbols including a second predetermined number of symbols which is different from said first number of symbols of said first string of symbols in order to obtain a displacement between the first and the second string of symbols along the first and the second row when the first and the second string of symbols are repeated.

2. A product as claimed claim 1, wherein the second string of symbols is a subset of the first string of symbols.

3. A product as claimed in claim 2, wherein the second string of symbols is equal to the first string of symbols except that the last symbol of the first string of symbols has been cancelled.

4. A product as claimed in claim 1, wherein the position-coding pattern comprises a plurality of first rows and a plurality of second rows, a start position of each row being predefined to define a position in a second dimension.

5. A product as claimed in claim 1, wherein the position-coding pattern further is based on a third string of symbols having said characteristic of the first string of symbols, the third string of symbols being used to determine the position in a second dimension on the surface.

6. A product as claimed in claim 5, wherein the third string of symbols is a number series consisting of numbers, each of which represents a position in a second dimension on the surface.

7. A product as claimed in claim 5, wherein the first string of symbols is a series of binary numbers and the third string of symbols is a number series with a different base.

8. A product as claimed in claim 1, wherein the first and the second rows begin in predefined positions in the first and the second strings of symbols.

9. A product as claimed in claim 1, wherein the symbols comprise a first symbol of a first type and a second symbol of a second type, said first and second symbols having the same form but different size.

10. A storage medium for a computer, on which a computer program is stored with instructions for decoding of the position-coding pattern on a product as claimed in claim 1.

11. A storage medium for a computer, on which a computer program is stored with instructions for generating the position-coding pattern on a product as claimed in claim 1.

12. A device for position determination, comprising a sensor for imaging a partial surface of a plurality of partial surfaces on a surface and image-processing means adapted to decode a position-coding pattern on a product as claimed in claim 1.

13. A device as claimed in claim 12, further comprising a pen point for writing on the surface.

14. A device as claimed in claim 12, further comprising means for wireless transfer of position information.

15. A method of generating a position-coding pattern, which position-coding pattern is arranged for coding a plurality of positions on a surface, comprising:

arranging symbols on a first row in accordance with a first string of symbols, repeated several times and which comprises a first predetermined number of symbols and which has the characteristic that if a group of symbols comprising a specific number of symbols less than said first number is taken from the first string of symbols, the location of the group of symbols in the string of symbols is unambiguously determined, and arranging symbols on a second row in accordance with a second string of symbols, repeated several times and having the same characteristic as the first string of symbols, said second string of symbols including a second predetermined number of symbols which is different from said first number of symbols of said first string of symbols in order to obtain a displacement between the first and the second string of symbols along the first and the second row when the first and the second string of symbols are repeated.

16. A method as claimed in claim 15, further comprising the step of generating a plurality of first rows and a plurality of second rows with symbols arranged according to the first and the second string of symbols, respectively, in such a manner that a start position of each row being predefined to define a position in a second dimension.

17. A method as claimed in claim 15, further comprising the step of beginning the first and the second rows in such positions in the first and the second string of symbols, respectively, that a difference between the first and the second string of symbols is reproducible on a number series having said characteristic of the first string of symbols.

18. A storage medium for a computer, on which a computer program is stored for determining a position of a partial surface on a surface which is provided with a position-coding pattern which comprises a plurality of symbols, on the basis of an input signal representing the partial surface, said computer program comprising instructions for:

identifying a plurality of symbols in the input signal, which symbols are arranged in a predetermined number of groups of symbols;

determining the location of each group of symbols in a first predetermined string of symbols;

determining a difference number which is based on the relative positions of the groups of symbols in said first predetermined string of symbols;

determining the location of said difference number in a second predetermined number series;

determining a first coordinate for the position of the partial surface on the surface on the basis of the location of said difference number in the second predetermined number series; and determining a second coordinate for the position of the partial surface on the surface on the basis of the relative positions of two adjoining groups of symbols in said first predetermined string of symbols.

19. A storage medium as claimed in claim 18, wherein the symbols in the position-coding pattern are arranged in rows so that each group of symbols is identified from one row, and instructions for determining a second coordinate comprises instructions for determining, for two groups of symbols from adjoining rows, in which position the string of symbols begins on the row, and, starting from these two starting positions and the relative positions of the two groups of symbols in the first string of symbols, determining the second coordinate.

20. Use of a position-coding pattern for determining a position, which position-coding pattern is based on a first string of symbols including a first predetermined number of symbols and which has the characteristic that if a group of symbols comprising a specific number of symbols less than said first number is taken from the first string of symbols, the location of said group of symbols in the string of symbols is unambiguously defined, and which position-coding pattern comprises said symbols in the first string of symbols, the symbols being arranged in a first row in accordance with the first string of symbols, repeated several times, and a second row in accordance with a second string of symbols, repeated several times and having said characteristic of the first string of symbols, said second string of symbols including a second predetermined number of symbols which is different from said first number of symbols of said first string of symbols in order to obtain a displacement between the first and the second string of symbols along the first and the second row when the first and the second string of symbols are repeated.

21. Use as claimed in claim 20, wherein the second series of symbols is a subset of the first series of symbols.

22. Use as claimed in claim 20 or 21, wherein the position-coding pattern comprises a plurality of first rows and a plurality of second rows and further is based on a third string of symbols which is a number series and which has said characteristic of the first string of symbols, the symbols being arranged in said rows such that a difference is obtained between the strings of symbols on adjacent rows so that the difference between the rows is arranged in accordance with the third string of symbols.

23. Use as claimed in claim 21, wherein the second string of symbols is equal to the first string of symbols except that the last symbol of the first string of symbols has been cancelled.

* * * * *